United States Patent Office

3,314,807
Patented Apr. 18, 1967

3,314,807
WATER-BASE ADHESIVE CONTAINING A
HYDROXYLAMINE STABILIZER
Kenneth A. E. Blackmore, Bellingham, Wash., assignor to Georgia-Pacific Corporation, Portland, Oreg., a corporation of Georgia
No Drawing. Filed Oct. 17, 1963, Ser. No. 317,037
14 Claims. (Cl. 106—127)

This invention relates to a water-base adhesive and, more particularly, to an adhesive comprising a mixture of a lignosulfonate adhesive and an animal glue and a method for its preparation and use.

Water-base adhesives are widely used under different conditions and various methods of application in fabrication, packaging, and other fields employing paper, paperboard, chipboard, and like cellulosic materials. In many applications, animal glues have been used extensively, since these adhesives have working properties which are required for particular operations. For example, in the fabrication of paper items, such as rigid paper tubes or cores used as the centers for rolling of materials, the adhesive is machine applied, for example, by a roller. The viscosity of the adhesive must be such that it flows readily at the temperature of application but does not migrate once applied to ooze out through the abutting layers or joints, which is not only unsightly but results in undesirable adhesion to other materials. In addition, the adhesive must possess good tack properties to form sufficient bond in a short time to permit rapid operation and still be free of webbing or stringing.

Lignosulfonate materials such as the sulfonated residual pulping liquors as spent sulfite liquor and sulfonated residual pulping liquors obtained from the kraft process have adhesive properties and have been used as water-base adhesives for certain applications. However, the working properties as well as the bonding strength of these materials are such that they have very limited utility in the adhesive field. Various treatments have been suggested to improve the adhesive properties without very much success. Attempts to improve the properties by addition of other adhesives such as dextrin, animal glues and such have likewise been relatively unsuccessful. Lignosulfonates are often incompatible with other glues. For example, when lignosulfonates are intermixed with animal glue in an aqueous medium, gelation is usually obtained in the more concentrated mixtures resulting in an exceedingly stringy adhesive. At concentrations necessary to obtain a reasonable bonding time, the adhesive is unsuitable for machine application because it forms long strings in the applicator which transfer to rolls, belts, and other parts of the machinery. In relatively low concentration mixtures, a curd-type precipitate is obtained which makes the adhesive unsuitable for most applications.

Therefore, it is an object of this invention to provide a water-base adhesive having suitable working properties and bond strength to enable the adhesive to be used for most applications. Another object is to provide a lignosulfonate-containing adhesive which has proper flow properties, relative freedom from stringiness and adequate dry strength and is readily dispersed in hot water. A further object is to provide an adhesive comprising a mixture of a lignosulfonate adhesive and an animal glue which has working properties comparable to those of more expensive adhesives. A still further object is to provide a method of treating a mixture of a lignosulfonate and an animal glue to make the constituents compatible. It is also an object of this invention to provide a process of using a stabilized adhesive comprising a mixture of a lignosulfonate and an animal glue.

The above and other objects are attained, according to this invention, by providing a water-base adhesive comprising a mixture of lignosulfonate adhesive, animal glue and a small proportion of hydroxylamine. The addition of hydroxylamine renders the lignosulfonate and animal glue compatible and results in obtaining an adhesive which is stable and has working properties such that the mixture may be utilized in machine applications and other utilities now employing more expensive adhesives. Further, the stabilized adhesive has improved penetration which is due to the lignosulfonate component. When applied to paper and similar products, a portion of the adhesive is absorbed by the material resulting in a joint of greater depth and strength.

Lignosulfonates or lignosulfonate adhesive, used as the lignosulfonate component in the adhesive of this invention, may be obtained by the sulfonation of lignin from any source. Lignin is a polymeric substance of substituted aromatics found in plant tissue associated with cellulose and hemicelluloses. Thus, one of the main sources of the lignosulfonate is the residual pulping liquors of the pulp and paper industry where lignocellulosic materials such as wood, corn stalks, bagasse, and the like are processed to separate the pulp or cellulose from the lignin-containing portion. In some of these processes, for example, the neutral sulfite and bisulfite pulping processes, the lignin in the lignocellulosic material is sulfonated and dissolved in the residual pulping liquor. In other processes, for example, the alkaline process, the lignin is solubilized without being sulfonated. However, the lignin-containing product may be readily sulfonated by known methods such as the reaction of the product with a sulfite or bisulfite.

The lignosulfonates are often obtained as dilute solutions or products upon the sulfonation of lignin-containing materials. While these solutions may be intermixed with animal glue as the lignosulfonate adhesive without any processing or treatment, generally the dilute solutions are concentrated by evaporation or other means to increase the solids content to obtain the desired adhesive properties. The lignosulfonate-containing material may also be processed to recover the dissolved or dispersed materials as a dry solid to which a desired amount of water may be added. Besides concentrating, the lignosulfonate materials may be modified by addition of additives such as humectants, extenders, and others. Thus, the term "lignosulfonate adhesive," as used herein with respect to the lignosulfonate component, means a sulfonated lignin-containing material including the products obtained upon sulfonation of lignin-containing materials which have been concentrated, dried, or treated by addition of additives to the products to improve the adhesive or other properties.

While the lignosulfonate adhesive obtained from residual pulping liquors in the pulp and paper industry contain predominantly lignosulfonates, the product may contain many other constituents which are dissolved or extracted in the pulping process. Some of these constituents, such as, for example, the carbohydrates extracted in the sulfite pulping process, may enhance the adhesive properties of the residual liquor but are not essential. The sulfonated residual pulping liquors may be used containing all of the constituents, or the liquors may be processed to recover or remove certain constituents from the lignosulfonate or liquor. For example, fermentation may be employed to convert the fermentable sugars to an alcohol or other compounds. The lignosulfonates may be present in the form of salts or complexes of certain metals such as magnesium, ammonium, sodium, and others, as a result of the sulfonation process used. The salts or complexes of the metal as obtained may be used or the products may be converted to salts or complexes of other metals.

Animal glue, as the name implies, is an adhesive which is made from hides, bones, and similar slaughter house wastes. The glue is available in a number of forms, including a dry granulated product which is cooked with water prior to use in machine applications. The animal glues used in the formulation of adhesives of this invention may be unmodified or may be modified by being treated with agents such as wetting agents, dispersing agents, plasticizers and others. Bone glue, which is less costly, is generally preferred.

Although the addition of a small proportion of animal glue will result in an improvement in the adhesive properties of the lignosulfonate-containing adhesive, generally about 5 weight percent of animal glue is added to obtain an adhesive which may be used for many applications now employing other glues. The addition of 15 to 35% of animal glue is normally sufficient to obtain adhesive properties comparable to those of glues now used for rapid machine applications and may thus be used to replace these more expensive glues. Greater proportions of animal glue may likewise be added to the extent that it is the predominant contituent, for example, 95 weight percent, of the mixture. However, since the animal glue is considerably more expensive than the lignosulfonate constituent, minor proportions of the animal glue are preferred.

To obtain the desired adhesive properties, a small proportion of hydroxylamine must be added to stabilize the mixture of lignosulfonate adhesive and animal glue. The incompatibility of the lignosulfonate adhesive and the animal glue is present with all ratios of these constituents and the mixture is stabilized by the addition of the hydroxylamine. Usually, an amount of from about 0.5 to 5 weight percent of hydroxylamine based upon the animal glue content is employed, although as little as 0.1 weight percent of hydroxylamine is effective. The viscosity of the lignosulfonate-animal glue adhesive may decrease somewhat with the addition of hydroxylamine. Thus, the practical use of hydroxylamine is generally limited to an amount of about 20 weight percent of the animal glue content. However, if an adhesive of low viscosity with high solids content is desired, considerably higher amounts may be used.

It is not necessary to use hydroxylamine as the free base but salts or compounds of hydroxylamine which provide hydroxylamine ions in an aqueous medium may be employed. Since hydroxylamine is relatively unstable, the salts of hydroxylamine are preferred. Illustrative examples of some of these salts are hydroxylamine sulfate, hydroxylamine chloride, hydroxylamine nitrate, hydroxylamine acetate, and the acid salts such as hydroxylamine acid sulfate. These salts are also known as hydroxylammonium salts, for instance, hydroxylammonium sulfate.

No particular treatment is necessary to stabilize the mixture with the exception of intermixing the three constituents. The animal glue may be added to the lignosulfonate and vice versa or the hydroxylamine may be intermixed with either of the components prior to addition of the last constituent. If all of the constituents are not to be intermixed within a short time, it is generally preferred to add the hydroxylamine to the animal glue prior to mixing with the lignosulfonate. The intermixing may be carried out with the dry constituents and the mixture maintained in a dry form until ready for use, or the adhesive may be prepared by intermixing the constituents in an aqueous medium and then drying the product. Usually, when a sulfonated residual pulping liquor is used and the adhesive is to be used within a short time, the residual pulping liquor as obtained from the pulping process is evaporated to a concentration such that upon addition of the animal glue and hydroxylamine the resulting mixture will have the desired solids content.

In the application of the adhesive, methods and procedures which have been used for animal glue and other water-base glues may be used. The substitution of the stabilized mixture for animal glues may be made in many applications without the need of any appreciable adjustment of equipment or conditions. The adhesives may be applied at an elevated temperature such as 50° C. to 70° C. to obtain the rapid setting time required for many machine applications.

To illustrate the effect of various portions of hydroxylamine on the stringing, bonding time, and viscosity, a series of tests was made using an adhesive mixture containing about 75% lignosulfonate adhesive and 25% animal glue. The animal glue used was a commercial bone glue having a gel strength in the range of 190 to 220 grams.

The lignosulfonate adhesive was a fermented spent sulfite liquor obtained from a calcium bisulfite digestion of softwoods. The spent sulfite liquor obtained in the digestion was fermented to convert the fermentable carbohydrates to alcohol which was stripped from the fermented liquor prior to concentration and spray drying.

The adhesive mixture was prepared by intermixing dried animal glue, spray dried lignosulfonate, and hydroxylamine with water, yielding a product having a solids content of 55% by weight, exclusive of the hydroxylamine. The hydroxylamine was added as hydroxylamine sulfate.

After the adhesive mixture was heated for one to two hours at 60° C., it was tested for stringing properties and bonding time.

The stringing properties of the mixture were evaluated by mixing the adhesive at 60° C. with a Hamilton Beach Drinkmaster type mixer and noting the degree of adherence and buildup of the adhesive on the mixer shaft. A correlation exists between the results of this test and behaviour of the adhesive in machine applications.

The bonding time was determined by measuring the period of time required to effect an adequate bond between a strip of paperboard to which had been applied a thin layer of adhesive, and a similar strip of paperboard which had been brought in contact with the first paperboard strip four seconds after the application of the adhesive. The glued strips of paperboard were slowly pulled apart, and the time elapsed between the initial application of adhesive and the occurrence of pulling of fibers from the paperboard surface in areas greater than ¼ sq. in. was designated as the bonding time.

The results obtained are shown in the table below.

| Test No. | Hydroxylamine ($NH_2OH$) Wt. percent of Animal Glue | Stringing | Bonding Time, sec. | Brookfield Viscosity (cps. at 60°) |
|---|---|---|---|---|
| Blank | 0 | Severe | 10 | 7,500 |
| 1 | 0.18 | Slight | 10 | 6,100 |
| 2 | 0.37 | Very slight | 10 | 6,100 |
| 3 | 0.72 | ----do---- | 12 | 4,900 |
| 4 | 1.32 | None | 14 | 4,500 |
| 5 | 4.3 | ----do---- | 19 | 3,500 |
| 6 | 11.5 | ----do---- | 45 | 2,300 |

Similar results were obtained when using different animal glues. Lignosulfonate adhesives obtained from unfermented calcium base spent sulfite liquor, as well as ammonium base liquor, sulfonated kraft liquor and sodium base liquor gave similar results.

Similar improvements were obtained when the hydroxylamine was added as hydroxylamine acid sulfate or hydroxylamine hydrochloride. The free base $NH_2OH$ and other salts are equally effective upon the addition of equivalent amounts.

To show that the hydroxylamine is effective in the stabilization of animal glue and lignosulfonate adhesive mixtures without deterioration upon aging at temperatures used for machine application, a series of tests was made using a mixture containing 25% animal glue and 75% lignosulfonate adhesive prepared in a manner described above.

The adhesive, upon preparation and intermixing, was heated to 60° C. and the stringiness of the mixture was tested. The mixture was maintained at that temperature and again tested after one day and after four days. The results are shown below.

| Test No. | Hydroxylamine (NH₂OH) Wt. percent of Animal Glue (Added as hydroxylamine sulfate) | Stringing after heating at 60° C. | | |
|---|---|---|---|---|
| | | Initial | 24 hrs. | 4 days |
| 1 | 0 | Severe | Gelled | Gelled. |
| 2 | 0.8 | Slight | Slight | Slight. |
| 3 | 1.2 | do | None | None. |

A test similar to that described was made except that upon intermixing the animal glue, lignosulfonate adhesive, and hydroxylamine, the mixture was dried at 50° C. to obtain the adhesive in a dry solid form. The dry product was then reconstituted by the addition of water to obtain a mixture having a concentration of 55 weight percent solids. The mixture was heated at 60° C. and its stringiness was tested initially and after the glue had been heated for 3 and 7 days, respectively. The results are shown below and are compared to the mixture to which no hydroxylamine had been added.

| Hydroxylamine Wt. percent of Animal Glue | Stringiness after heating at 60° C. | | | |
|---|---|---|---|---|
| | Initial | After Drying | 3 days | 7 days |
| 0 | Severe | Severe | Gelled | Gelled. |
| 0.72 | Very slight | Very slight | None | None. |

To illustrate the utility of the stabilized lignosulfonate adhesive and animal glue mixture in machine application, a mixture containing 75% lignosulfonate solids and 25 percent animal glue was used to which 0.8 weight percent of hydroxylamine as hydroxylamine sulfate, based upon the weight of the animal glue was added. The constituents were intermixed with water to obtain a mixture which contained about 50 to 55 weight percent solids. This mixture was substituted for an animal glue in a machine used in the formation of rigid paper tubes.

The paper core tubes were made by feeding two strips of paperboard tangentially onto a mandrel of a tube winding machine where the tube was formed continuously by pressure applied by an endless belt. Adhesive was applied to one surface of one of the strips of the paperboard. When the surface covered with adhesive met the second strip of paperboard on the mandrel, bonding of the two surfaces occurred. The tube was thus formed continuously and was cut off in lengths desired. In the operation, the strips of paperboard used were 3 inches wide and tubes 6 feet in length were made. The glue was applied at a temperature of 60° C. About three seconds elapsed between the application of the glue to the paperboard and the formation of the bond, and the two strips were held in contact for approximately three seconds before the tubes were cut off.

The animal glue in the machine glue applicator reservoir was replaced by the lignosulfonate-animal glue mixture and paperboard tubes were obtained comparable to those made with the animal glue with substantially no adjustment of the machine.

What is claimed is:

1. A water-base adhesive comprising a mixture of a lignosulfonate adhesive, animal glue, and an effective stabilizing amount of hydroxylamine.

2. An adhesive of claim 1 wherein the lignosulfonate adhesive is a sulfonated residual pulping liquor.

3. A water-base adhesive comprising at least five weight percent of animal glue, from 0.1 to 20 weight percent of hydroxylamine based upon the weight of the animal glue, and a lignosulfonate adhesive.

4. An adhesive according to claim 3 wherein the lignosulfonate adhesive is a sulfonated residual pulping liquor.

5. An adhesive according to claim 4 wherein the sulfonated residual pulping liquor is a spent sulfite liquor.

6. A water-base adhesive comprising at least five weight percent of animal glue, from 0.5 to 5 weight percent of hydroxylamine based upon the weight of the animal glue, and a lignosulfonate adhesive.

7. A water-base adhesive comprising from 15 to 35 weight percent of animal glue, from 0.5 to 5 weight percent of hydroxylamine based upon the weight of the animal glue, and the remainder being substantially a lignosulfonate adhesive.

8. A water-base adhesive comprising a mixture of from 15 to 35 weight percent of animal glue, from 0.5 to 5 weight percent of hydroxylamine based upon the weight of the animal glue, and the remainder being substantially a spent sulfite liquor.

9. A process for stabilizing a mixture of animal glue and a lignosulfonate adhesive, which comprises intermixing hydroxylamine with the animal glue and subsequently intermixing the animal glue containing the hydroxylamine with the lignosulfonate adhesive.

10. A process according to claim 9 wherein the hydroxylamine is added to the animal glue in an amount of from 0.1 to 20 weight percent of hydroxylamine, based upon the weight of the animal glue.

11. A process of stabilizing a mixture of animal glue and a sulfonated residual pulping liquor, which comprises intermixing hydroxylamine with animal glue in an amount of from 0.1 to 5 weight percent of hydroxylamine based upon the weight of the animal glue, and intermixing the animal glue and hydroxylamine with a sulfonated residual pulping liquor in an amount such that the mixture contains from 15 to 35 weight percent of animal glue.

12. A process of jointing lignocellulosic materials by adhesion of contacted portions of the materials, which comprises applying an adhesive comprising a mixture of animal glue, lignosulfonate adhesive, and an effective stabilizing amount of hydroxylamine to a portion of at least one of the materials, contacting the adhesive covered portion to the material to be jointed, and holding the contacted portions together until a bond is formed.

13. A process according to claim 12 wherein the adhesive comprises from 0.1 to 20 weight percent of hydroxylamine, based upon the animal glue content.

14. A process according to claim 13 wherein the adhesive comprises 15 to 35 weight percent animal glue and from 0.5 to 5 weight percent of hydroxylamine, based upon the weight of the animal glue.

References Cited by the Examiner

UNITED STATES PATENTS

| 486,870 | 11/1892 | Griffin | 106—123 |
| 1,464,949 | 8/1923 | Loffler | 106—123 |
| 3,220,866 | 11/1965 | Rosenthal | 106—14 |

ALEXANDER H. BRODMERKEL, *Primary Examiner.*

D. J. ARNOLD, *Assistant Examiner.*